United States Patent [19]

Berges et al.

[11] Patent Number: 4,588,504
[45] Date of Patent: May 13, 1986

[54] OIL CIRCUIT COUPLER FOR AN OIL-SEALED VACUUM PUMP

[75] Inventors: Hanns-Peter Berges, Cologne; Wolfgang Leier, Bergisch Gladbach, both of Fed. Rep. of Germany

[73] Assignee: Leybold-Heraeus GmbH, Cologne, Fed. Rep. of Germany

[21] Appl. No.: 782,610

[22] Filed: Oct. 1, 1985

[30] Foreign Application Priority Data

Oct. 2, 1984 [DE] Fed. Rep. of Germany ....... 3436079

[51] Int. Cl.$^4$ .................... F04C 27/02; F04B 39/16
[52] U.S. Cl. .................... 210/234; 210/416.5
[58] Field of Search .............. 417/510; 210/234, 240, 210/416.5; 137/625.27

[56] References Cited

U.S. PATENT DOCUMENTS

| | | | |
|---|---|---|---|
| 2,497,247 | 2/1950 | Von Wangerheim | 210/416.5 |
| 2,955,712 | 10/1960 | Gutkowski | 210/234 |
| 3,526,251 | 9/1970 | Rosaen | 210/234 X |
| 4,379,053 | 4/1983 | Brane | 210/234 |
| 4,529,515 | 7/1985 | Selz | 210/234 |

Primary Examiner—Richard E. Gluck
Attorney, Agent, or Firm—Spencer & Frank

[57] ABSTRACT

An oil-sealed vacuum pump has an oil circuit which has an externally located oil filter that may be operatively connected to or disconnected from the oil circuit by a coupler. The coupler has a rotatably supported valve disc having a first face oriented towards oil circuit ports in the pump and a second face oriented towards the filter. The valve disc further has spaced first and second apertures passing therethrough and a groove provided in the first face and oriented approximately perpendicularly to an imaginary line connecting the first and second apertures with one another. A valve actuating mechanism is provided for rotating the valve disc into a first position in which the first and second apertures are in registry with the circuit ports to maintain communication between the filter and the oil circuit and for rotating the valve disc into a second position in which the first and second apertures are out of registry with the circuit ports to block communication between the filter and the oil circuit and in which the groove is in registry with the circuit ports to maintain a direct communication therebetween to thus short-circuit the oil circuit.

11 Claims, 5 Drawing Figures

OIL CIRCUIT COUPLER FOR AN OIL-SEALED VACUUM PUMP

BACKGROUND OF THE INVENTION

This invention relates to an oil-sealed vacuum pump which includes an externally arranged oil circuit communicating with the pump by means of two ports and a filter assembly which is situated externally of the vacuum pump and which may be operatively connected to or disconnected from the oil circuit by a coupling device.

It is advisable to provide a mechanical vacuum pump, for example, a rotary vane pump or a rotary plunger pump with an oil filter if there are risks of a substantial soiling of the pump oil by solid particles such as dust. In case the pump is used in connection with chemicals, the use of a chemical oil filter is of particular importance to prevent corrosion of the pump by acid vapors. Conventionally, the filter arrangement in the oil circuit is such that a replacement of the filter elements can be effected only after the vacuum pump is brought to a standstill.

It is, however, often a desideratum to run vacuum pumps continuously over substantially extended periods. To make possible filter replacement while the pump is running, the oil circuit is conventionally arranged externally of the pump and the two parts which maintain communication between the pump and the oil circuit are each connected with a part of a hose coupling. Communication with the filter assembly is effected by two hoses each having the counterpart of the hose coupling and completing the oil circuit of the vacuum pump through the filter assembly. Prior to replacing a filter element, the hose couplings are disconnected and simultaneously, a blocking of the hoses and the ports of the oil circuit at the pump side is effected. Thereafter, a replacement of the filter or filter element may take place. The oil circuit at the pump side has to be short-circuited in order to prevent the build-up of an excessive pressure in the oil circuit due to the continuing run of the pump. Such short-circuiting is conventionally effected by a pressure relief valve which is situated at the pump side in the vicinity of the circuit ports.

The above-outlined conventional arrangement is disadvantageous in that hose couplings are used which, due to their relatively complex construction are prone to malfunction. The two hose couplings form, in essence, four coil spring-biased valves whose components are, during normal operation, exposed directly to the oil stream which may be carrying corrosive impurities. Risks of damage to the springs are particularly high. In case the springs are not able to function properly during the filter element replacement (that is, they are not capable of producing a sufficient closing force), the hot, soiled or even poisonous liquid pump sealant (oil) may escape.

Further, the functioning of the check valve required in the prior art construction is endangered to a degree proportionate to the impurities. In case the check valve does not open during filter replacement because of an excessive soiling, impermissible pressure increases and resulting oil conduit breaks are unavoidable. If, on the other hand, the check valve remains open after filter element replacement, a sufficient purification of the oil is no longer performed.

SUMMARY OF THE INVENTION

It is an object of the invention to provide an improved vacuum pump of the above-outlined type in which the coupling between the pump and filter assembly is effected in a simpler and operationally safer manner.

This object and others to become apparent as the specification progresses, are accomplished by the invention, according to which, briefly stated, the coupling comprises a valve disc which may be rotated by an actuating device and which is associated with the two ports of the oil circuit. The disc is provided with two apertures for establishing communication between the oil circuit and the filter assembly and further has a groove oriented approximately perpendicularly to the connecting line between the apertures. By virtue of this arrangement, communication may be cut off between the pump and the filter assembly, and simultaneously, a short-circuiting connection of the pump side ports of the oil circuit is effected.

It is an advantage of the invention that coil springs as well as a check valve for short-circuiting the oil circuit during filter element replacement are no longer needed. The number of moving components is, in the structure according to the invention, significantly reduced compared to the conventional hose couplings whereby the operational safety is significantly improved. Expediently, the end zones of the groove in the valve disc are provided with a unidirectional extension whose position and size is so selected that the disc, in an intermediate position, maintains communication between the oil circuit and the filter assembly by means of the extensions and also establishes a short circuit by means of the groove. Such an arrangement ensures that even during a switchover of the actuating device from the normal operation to the filter replacing operation a pressure increase due to a short-period blockage of the ports of the oil circuit is securely avoided.

According to a further feature of the invention, the coupling is provided with an additional valve disc arranged on the filter side, which is configured similarly to the first-noted valve disc arranged on the pump side. A turning of both discs is effected co-directionally and simultaneously by means of the actuating device, whereby the cutoff of the oil circuit from the pump by the first valve disc is accompanied by a blockage of the filter chamber by the second valve disc. In case of highly poisonous impurities present in the sealing fluid, such an arrangement is of substantial significance, because the filter assembly may be securely removed, with a sealingly closed filter chamber, to a remote location where it can be serviced.

DESCRIPTION OF THE PREFERRED EMBODIMENT

Figure 1:
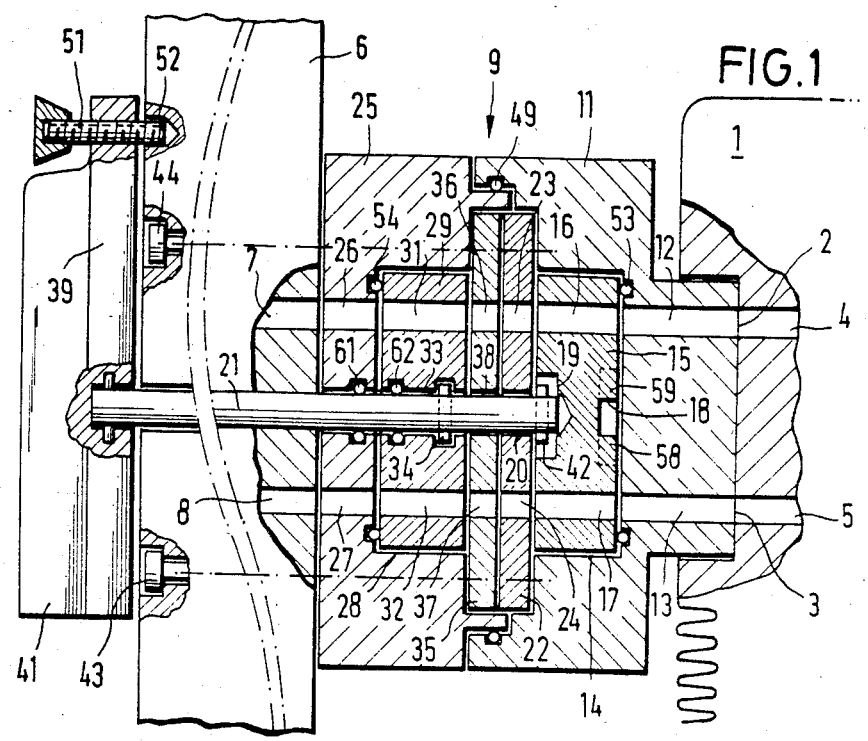
FIG. 1 is a sectional side elevational view of a preferred embodiment of the invention, illustrated in an assembled state.
Figure 2:
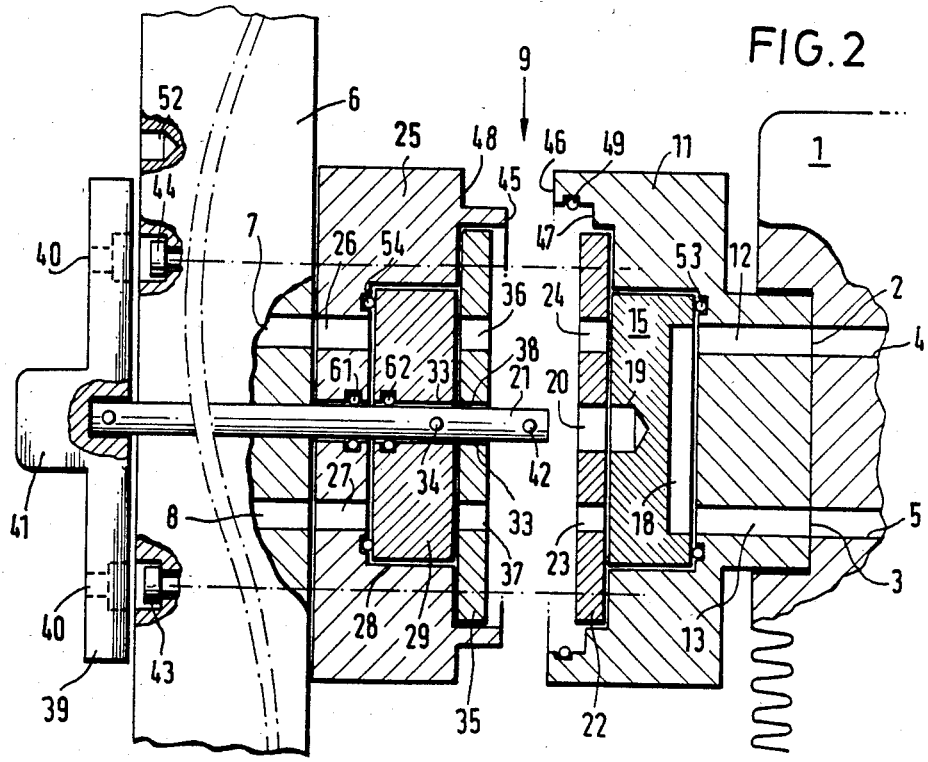
FIG. 2 is a sectional side elevational view of the preferred embodiment in a disassembled state.

Turning now to FIGS. 1 and 2, an oil-sealed vacuum pump 1 has an oil circuit which includes oil channels 4 and 5 terminating in ports 2 and 3, respectively, for circulating the oil externally of the vacuum pump 1. To the oil circuit of the vacuum pump 1, externally thereof, there is operatively connected a filter assembly accommodated in a filter housing 6. The oil channels which lead into and out of the filter housing 6 and which guide the oil through the filter (which is itself not illustrated) open to the exterior and are designated at 7 and 8, respectively.

A coupling generally designated at 9 has the purpose of maintaining a sealed communication between the channels 4 and 7 as well as between the channels 5 and 8 and of carrying the filter housing 6, as shown in FIG. 1. During filter replacement, the coupling 9 is to be released to provide that the filter housing 6 may be removed in its entirety from the pump 1 as illustrated in FIG. 2.

The coupling 9 comprises a fitting 11 which is permanently connected with the pump 1 and which is provided with channels 12 and 13 which are continuations of the oil channels 4 and 5, respectively. The fitting 11 has a cylindrical recess 14 in which is arranged a rotatable valve disc 15 having two throughgoing apertures 16 and 17 which are associated with the channels 12 and 13, respectively. That face of the valve disc 15 which is oriented towards the pump 1 has a recess or groove 18 which is oriented approximately perpendicularly to the imaginary line connecting the centers of the apertures 16 and 17 and whose length approximately corresponds to the distance between the apertures 16 and 17. On its face oriented towards the filter housing 6, the valve disc 15 is provided with a keyhole-shaped recess 19 adapted to receive the end of a shaft 21 of an actuating device.

The rotary valve disc 15 is held captive in the cylindrical recess 14 by means of a retaining disc 22 fixedly attached to the fitting 11. The fixed disc 22 has passages 23 and 24 which are aligned with respective channels 12 and 13 in the fitting 11 as well as a central, keyhole-shaped opening 20.

That half of the coupling 9 which adjoins the filter housing 6 is structured in a manner similar to the just-described coupling half adjoining the vacuum pump 1. A fitting 25, having passages 26 and 27 aligned with respective channels 7 and 8 is fixedly connected to the filter housing 6. The fitting 25 has a cylindrical recess 28 which receives a rotatable valve disc 29 provided with openings 31 and 32 cooperating with respective passages 26 and 27. Further, the valve disc 29 has a central aperture 33 providing a throughgoing passage for the shaft 21 of the actuating device. The shaft 21 and the disc 29 are fixedly attached to one another by means of a pin 34. The rotatable valve disc 29 is held captive in the cylindrical recess 28 by means of a fixed retaining disc 35. The latter has apertures 36 and 37 which are axially aligned with the passages 26 and 27 of the fitting 25. The disc 35 has a central aperture 38 through which the actuating shaft 21 passes.

The actuating device comprises an actuating lever 41, a disc 39 integral therewith, and the shaft 21 which is affixed to the actuating lever 41 and is further fixedly connected to the valve disc 29 by means of the pin 34. In the zone of its free end the shaft 21 is provided with a further pin 42 which cooperates with the keyhole-shaped opening 20 provided in the retaining disc 22 as well as with the keyhole-shaped depression 19 provided in the valve disc 15.

Further, the actuating lever 41 is associated with a safety lock to prevent accidental actuation of the lever 41. The safety device comprises a knurled-head securing screw 51 with which cooperate two threaded bores 52 (only one is visible in FIGS. 1 and 2) provided in the filter housing 6. The location of the two threaded bores 52 is so selected that the securing screw 51 may be threaded into the one or the other bore 52 dependent upon whether the actuating lever 41 is in the "normal run" position or in the "filter replacement" position. In the alternative, threadless bores may be provided in the filter housing 6 and, instead of a securing screw 51 a spring loaded securing pin may be used which may project into the respective bore in the filter housing 6.

The actuating lever 41 is situated on that side of the filter housing 6 which is oriented away from the coupling 9, and thus the actuating shaft 21 passes through the filter housing 6. For holding and securing the filter housing 6 to the vacuum pump 1 there are provided threaded bolts 43 and 44 which pass through the filter housing 6 and the fitting 25 and may be threaded into the fitting 11. In the position of the actuating lever 41 in which the filter housing 6 is connected to the oil circuit of the vacuum pump (normal operation, FIG. 1), the heads of the bolts 43, 44 are situated underneath the disc-like part 39 of the actuating lever 41 and are thus inaccessible, whereby an accidental removal thereof is prevented. Only in the "filter replacement" position of the actuating lever 41 are the bolts 43 and 44 accessible through bore holes 40 provided for this purpose in the disc 39. Each bore hole 40 has two successive portions of different diameters. The portion oriented towards the respecptive head of the bolts 43 and 44 has a slightly larger diameter while the other bore hole portions has a slightly smaller diameter than that of the head of the bolts 43 or 44. This arrangement ensures that the bolts 43 and 44 are prevented from falling out during the "filter replacement" position of the actuating lever 41.

The fittings 11 and 25 are provided in their peripheral zones with respective projections 45 and 46 received, respectively, by peripheral recesses 47 and 48. In this peripheral zone a radial sealing ring 49 is provided which normally has no sealing function and becomes operative only if any of the sealing elements of the coupling becomes defective.

In normal operation (FIG. 1), by an appropriate setting of the actuating lever 41, the channel 4 of the oil circuit in the pump 1 communicates with the channel 7 in the filter housing 6 by means of the channels 12 and 16, the openings 23 and 36 as well as the channels 31 and 26, while the channel 5 of the oil circuit communicates with the channel 8 by means of the channels 13 and 17, the openings 24 and 37 as well as the channels 32 and 27. A satisfactorily sealed condition of the system is ensured by providing that the radial faces of the disc-like components are sufficiently accurately planar; thus, separate coil springs are not needed. The operational oil pressure presses the valve discs 15 and 29 against their respective retaining discs 22 and 35 and thus provides a satisfactory seal.

Upon loosening the safety screw 51 and turning the actuating lever 41 by 90°, a position of the coupling components is obtained which is illustrated in FIG. 2. The channels 4 and 5 are, in this position of the coupling 9, connected to one another by the groove 18, whereby the oil circuit of the vacuum pump 1 is short-circuited. The channels 7 and 8 are blocked by the valve disc 29, thus preventing an undesired escape of soiled fluid sealant from the filter housing 6. In the position of the actuating lever 41 illustrated in FIG. 2, the bolts 43 and 44 are accessible through the bores 40 provided in the disc part 39 of the lever 41. After loosening the bolts 43 and 44, the filter housing 6 may be entirely removed from the vacuum pump 1.

Between the valve discs 15 and 29 as well as between the associated fittings 11 and 25 there are provided, in outer zones thereof, O-rings 53 and 54 which may be of Viton that has superior corrosion-resistant properites. As the valve discs 15 and 29 are—as noted earlier—pressed against the respective retaining discs 22 and 35, a clearance may appear on the pressure side. The O-rings 53 and 54 serve for sealing such a clearance to prevent oil from leaking outwardly behind the disc 15 and 29. O-rings 61 and 62 are provided for sealing the shaft 21 against such an oil leakage.

Figure 3:
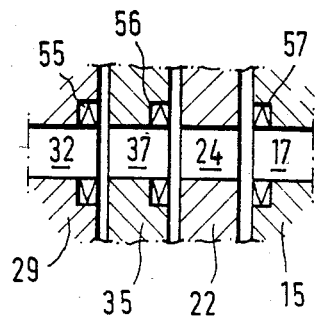
FIG. 3 is a fragmentary sectional side elevational view of components of the preferred embodiment.

Additionally, to further increase the seal in the zone of the passages 36, 37, or 23, 24 in the respective stationary discs 35 and 22, sealing rings 55, 56 and 57 made preferably of Teflon may be used, as shown in FIG. 3. The sealing rings may have a spring core whose purpose is to prevent the Teflon material from flowing.

Figure 4:
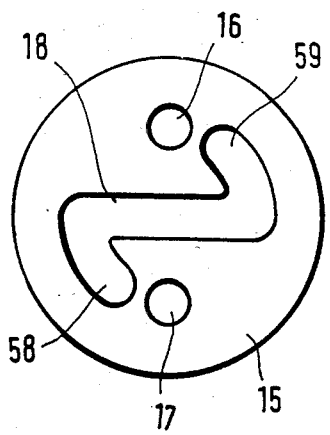
FIG. 4 is a front elevational view of a component of the preferred embodiment.
Figure 5:
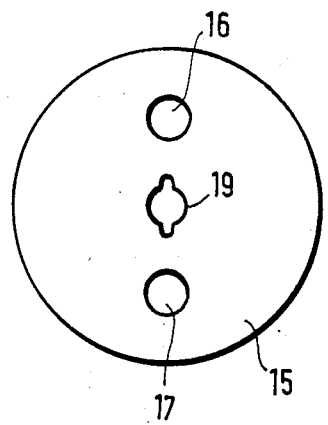
FIG. 5 is a rear elevational view of the component shown in FIG. 4.

Turning now to FIGS. 4 and 5, there are illustrated the two opposite sides of the valve disc 15 provided with the openings 16 and 17. It is seen in FIG. 4 that the groove 18 is oriented generally perpendicularly to a connecting line between the two disc apertures 16 and 17. In its opposite terminal zones the groove 18 is provided with unidirectional extensions 58 and 59. Thus, in intermediate positions of the valve disc 15 (for example, in an approximately 20-degree counterclockwise offset from the position shown in FIG. 4) the aperture 16 as well as the extension 59 are in a partial registry with channels 4, 12 and further, the aperture 17 as well as the extension 58 are in a partial registry with channels 5, 13. Consequently, in such intermediate positions the channels 4 and 5 which form part of the oil circuit at the pump side (inner oil circuit portion) are short-circuited by the groove 18 and are, at the same time, in communication with the channels 7 and 8 provided in the filter housing 6 and forming part of an outer oil circuit portion. The unidirectional extensions 58 and 59 are so oriented that in each position of the actuating lever 41 only one of the following three coupling possibilities may be present:

(a) Communication between the channels 4 and 5 in the vacuum pump 1 with respective conduits 7 and 8 in the filter housing 6;
(b) Short-circuiting of the channels 4 and 5 by means of the groove 18; and
(c) Occurrence of (a) and (b) simultaneously (intermediate position).

Thus, the coupling device 9 excludes the possibility of an intermediate position of the disc 15 in which neither a connection between the channels 4 and 5 and between the channels 7 and 8 is maintained, nor is there a short-circuiting of the channels 4 and 5. This eliminates the risks of a build-up of an excessively high pressure in the oil circuit of the vacuum pump 1.

It will be understood that the above description of the present invention is susceptible in various modifications, changes and adaptations, and the same are intended to be comprehended within the meaning the range of equivalents of the appended claims.

What is claimed is:

1. In an oil-sealed vacuum pump having an oil circuit in which pump oil is circulated; said oil circuit having an outer circuit portion situated externally of the pump and an inner circuit portion within the pump; first and second ports in said pump connecting said outer circuit portion to said inner circuit portion; a filter assembly situated externally of said pump and connected in said outer circuit portion; and a coupler connected in said outer circuit portion and having first and second operating positions for maintaining communication between or, respectively, sealing said filter assembly from said inner circuit portion; the improvement wherein said coupler comprises a rotatably supported valve disc having a first face oriented towards said first and second ports and a second face oriented towards said filter assembly; said valve disc further having first and second apertures passing through the valve disc and having a predetermined distance from one another and a groove provided in said first face and oriented approximately perpendicularly to an imaginary line connecting said first and second apertures with one another; and actuating means for rotating said valve disc into a first position in which said first and second apertures are in registry with said first and second ports, respectively, to maintain communication between said filter assembly and said inner circuit portion and for rotating said valve disc into a second position in which said first and second apertures are out of registry with said first and second ports to block communication between said filter assembly and said inner circuit portion and in which said groove is in registry with said first and second ports to maintain a direct communication between said first and second ports for short-circuiting said inner circuit portion.

2. A coupler as defined in claim 1, wherein said groove has two opposite ends; further comprising two groove extensions prolonging said groove beyond said ends in opposite directions generally parallel to a circumference of said valve disc; said valve disc having an intermediate position between said first and second positions; in said intermediate position said first and second apertures maintain communication between said filter assembly and said inner circuit portion and simultaneously, said groove extensions and said groove maintain a direct communication between said first and second ports for short-circuiting said inner circuit portion.

3. A coupler as defined in claim 1, wherein said actuating means comprises an actuating shaft and means for releasably connecting said valve disc with said actuating shaft.

4. A coupler as defined in claim 1, further comprising at least one sealing ring surrounding at least one of said apertures.

5. A coupler as defined in claim 1, wherein said valve disc is a first valve disc; further comprising a first fitting secured to said pump and accommodating said first valve disc; a second fitting secured to said filter; mechanical connecting means for releasably securing said first and second fittings to one another; said second fitting including two throughgoing oil channels forming part of said outer circuit portion; a second valve disc rotatably supported in said second fitting and being operatively connected to said actuating means for being rotated thereby in synchronism with said first valve disc; said second valve disc having spaced throughgoing third and fourth apertures; said second valve disc having a first position which it assumes simultaneously with the first position of said first valve disc and in which said third and fourth apertures are in registry with respective said oil channels; said second valve disc having a second position which it assumes simultaneously with the second position of said first valve disc and in which said third and fourth apertures are out of registry with said oil channels for sealing off said oil channels from said first valve disc.

6. A coupler as defined in claim 5, further comprising first and second retainer discs affixed to said first and second fitting, respectively, and arranged for holding captive said first and second valve discs in respective said first and second fittings.

7. A coupler as defined in claim 6, further comprising a first sealing ring situated between said first valve disc and said first fitting and a second sealing ring situated between said additional second valve disc and said second fitting.

8. A coupler as defined in claim 1, further comprising means for securing said coupler to said pump and means for securing said filter assembly to said coupler, whereby said coupler constitutes a mount attaching said filter assembly to said pump.

9. A coupler as defined in claim 8, wherein said actuating means comprises an actuating shaft passing through said filter assembly; means for releasably connecting said valve disc with said actuating shaft; and an actuating lever mounted externally on said filter assembly at a location thereof which is oriented away from said coupler; said actuating shaft being connected with said actuating lever; said actuating lever being arranged for movement into first and second positions for rotating said valve disc into its said first and second position, respectively.

10. A coupler as defined in claim 9, further comprising safety means for preventing said actuating lever from accidental motion from the first and second positions thereof.

11. A coupler as defined in claim 9, further comprising securing screw means for releasably mounting said filter assembly on said pump; each securing screw means having a screw head arranged with respect to said actuating lever such that in said first position of said actuating lever each screw head is covered by said actuating lever for rendering each screw head inaccessible and in said second position of said actuating lever each screw head is uncovered by said actuating lever for rendering each screw head accessible.

* * * * *